United States Patent [19]

Sills

[11] Patent Number: 5,598,961
[45] Date of Patent: Feb. 4, 1997

[54] VEHICLE TOOL BOX

[75] Inventor: Robert L. Sills, Story City, Iowa

[73] Assignee: Putco, Inc., Sioux City, Iowa

[21] Appl. No.: 377,190

[22] Filed: Jan. 24, 1995

[51] Int. Cl.$^6$ ..................................................... B60R 9/00
[52] U.S. Cl. ........................................................... 224/404
[58] Field of Search ..................................... 224/404, 403

[56] References Cited

U.S. PATENT DOCUMENTS

| | | | |
|---|---|---|---|
| 4,288,011 | 9/1981 | Grossman | 224/404 |
| 4,850,519 | 7/1989 | Farmer, Jr. | 224/404 |
| 5,052,737 | 10/1991 | Farmer, Jr. | 224/404 X |
| 5,186,510 | 2/1993 | Stapp | 224/404 X |

*Primary Examiner*—Renee S. Luebke
*Attorney, Agent, or Firm*— Zarley, McKee, Thomte, Voorhees & Sease

[57] ABSTRACT

A chest for use in a pickup truck includes a chest bottom forming a compartment and having a rim extending around its open upper end. A chest top includes a frame adapted to matingly fit against the rim of the chest bottom and forms at least one frame opening therein. A chest lid is hinged to the chest top and is sized to fit in covering relation over the frame opening. The top frame and the chest bottom are detachably secured together.

7 Claims, 9 Drawing Sheets

VEHICLE TOOL BOX

BACKGROUND OF THE INVENTION

The present invention relates to a vehicle tool box.

Tool boxes have been provided for use in vehicles such as pickup trucks. However, several deficiencies for these tool boxes presently exist.

One disadvantage in the manufacturing and marketing of tool boxes for vehicles is the difficulty in shipping the tool boxes for marketing purposes. Carriers who provide shipping of these tool boxes generally have requirements relating to the dimensions and sizes of the object which can be transported. A typical requirement is one which requires the object being shipped to have a girth and length which when added together do not exceed 130 inches. These dimensions are very difficult to achieve with tool boxes provided for pickup trucks.

Another deficiency of presently known vehicle tool boxes is the ability to provide securement of the tool box to the vehicle either in a transverse direction, or in a longitudinal direction so that it does not move during the operation of the vehicle.

A further shortcoming of present prior art tool boxes is the inability to provide securing means for the tool boxes which are not exposed to the elements.

SUMMARY OF THE INVENTION

Therefore a primary object of the present invention is the provision of an improved vehicle tool box.

A further object of the present invention is the provision of an improved vehicle tool box which can be manufactured in two parts capable of meeting shipping size limitations individually, but which can be assembled after shipping into a size which exceeds conventional shipping size limitations.

A further object of the present invention is the provision of an improved vehicle tool box which is comprised of a top portion and a bottom portion which can be easily assembled at the shipping destination.

A further object of the present invention is the provision of an improved vehicle tool box which can be secured within a pickup truck by securing means which are not exposed to the elements.

A further object of the present invention is the provision of an improved vehicle tool box which will fit longitudinally within a pickup truck and which will straddle the wheel well within the back of a pickup truck.

A further object of the present invention is the provision of an improved tool box which is economical to manufacture, durable in use and efficient in operation.

The foregoing objects may be achieved by a tool box or chest which is adapted to be used in a pickup truck having a carrier bed and side walls extending upwardly from the opposite sides of the carrier bed, the side walls each having an upper edge. The tool box or chest includes a chest bottom having a bottom wall, a front wall, a rear wall, and opposite end walls forming a compartment having an open upper end. The front, rear, and end walls have upper edges which together form a rim extending around the open upper end.

A chest top includes a chest lid and a top frame forming a frame opening. The chest lid is sized to fit in covering relation over the frame opening to enclose the compartment. A hinge pivotally secures the lid to the top frame for pivotally movement from an open position providing access to the frame opening to a closed position in covering relation over the frame opening.

A securing means detachably secures the top frame to the rim of the chest bottom whereby the chest top frame forms a closure over the open upper end of the chest bottom when the lid is in its closed position.

The securing means may be bolts, screws, clamps, or rivets or any other securing devices which provide securement of the two parts together.

In a modified form of the invention, the chest top includes more than one door opening and more than one lid.

In another modified form of the invention, the chest includes legs extending downwardly from the opposite ends of the chest bottom, so that the chest can straddle the wheel well inside the bed of a pickup truck.

DETAILED DESCRIPTION OF THE PREFERRED EMBODIMENT

Figure 1:
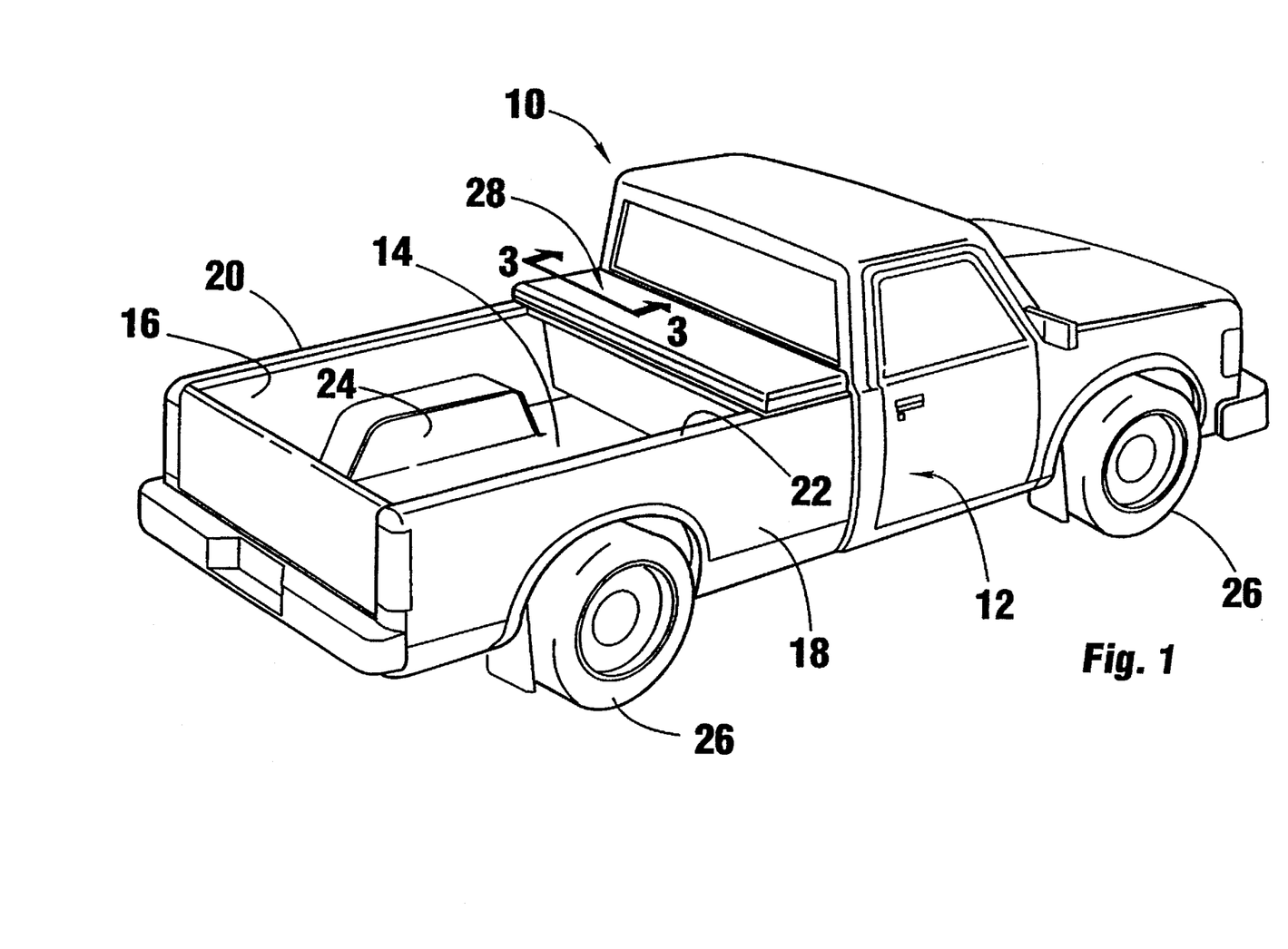
FIG. 1 is a pictorial view of a pickup truck having the tool chest of the present invention therein.

Referring to the drawings the numeral 10 generally designates a typical pickup truck having a cab 12, and a truck bed 14. Extending upwardly from the edges of truck bed 14 are a pair of side walls 16, 18 each of which has an elongated upper edge 20, 22 respectively. A wheel well 24 protrudes into the space provided between the side walls 16 and 18. The truck also includes wheels 26.

Figure 2:
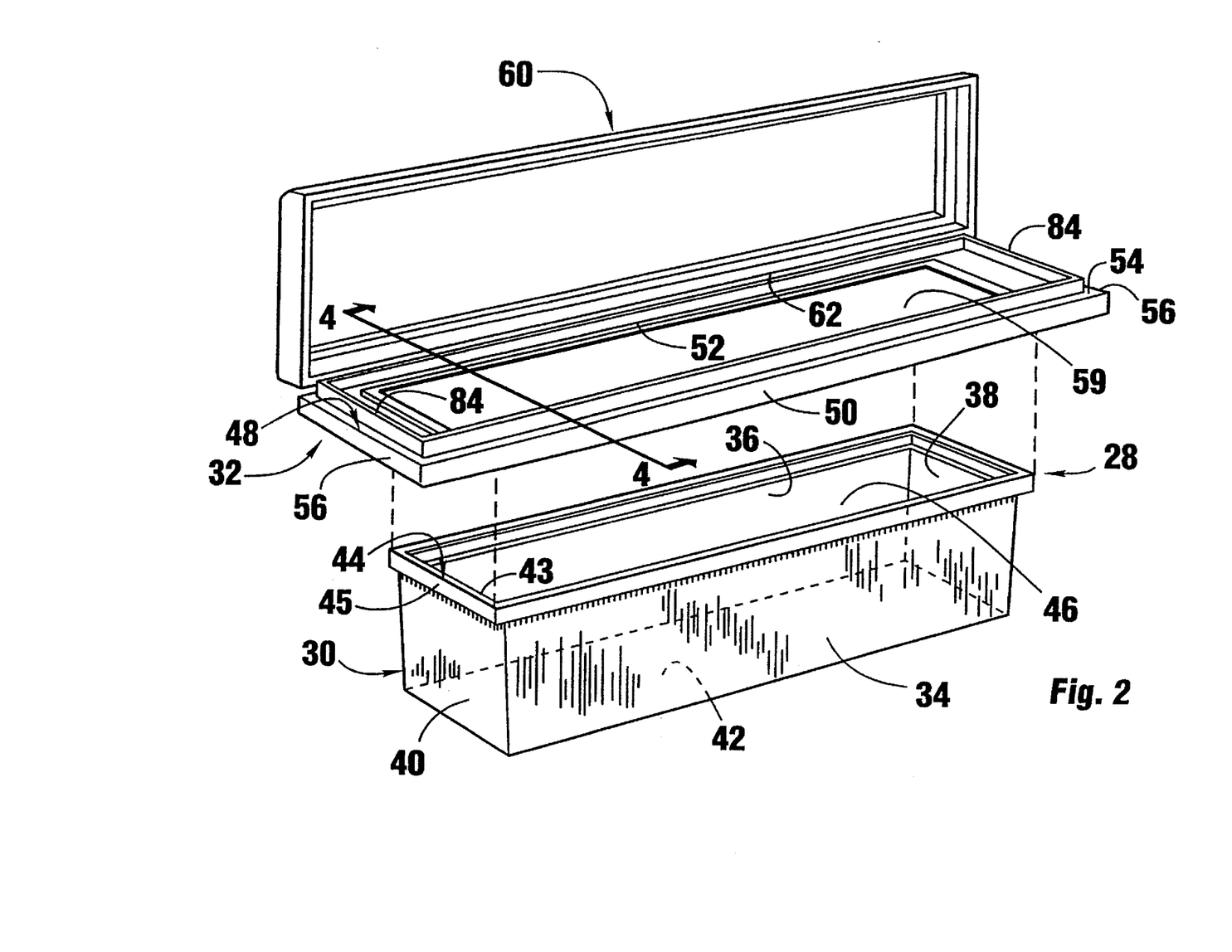
FIG. 2 is an exploded pictorial view of one modified form of the present invention.

Mounted within the back of the pickup truck is a tool chest 28. Tool chest 28 is formed from a chest bottom 30 and a chest top 32. Chest bottom 30 includes a front wall 34, a rear wall 36, opposite end walls 38, 40, and a bottom wall 42. Extending around the upper edges of the front, rear, and end walls 34, 36, 38, 40 is a rim 44 which in cross section includes a horizontal rim flange 43 and a vertical rim flange 45. A compartment 46 is formed within the walls 34, 36, 38, 40, 42 of the chest bottom 30.

Chest top 32 includes a top frame 48 comprised of a front frame member 50, a rear frame member 52, and a pair of opposite end frame members 54, 56 forming a rectangular frame opening 59 within the top frame 48.

A lid 60 is mounted to the top frame 48 by means of an elongated hinge 62. The cross sectional configurations of the ends of the lid 60, the chest top 32, and the chest bottom 30 are partially shown in FIG. 3. Within the end of lid 60 is a horizontal flange 64, a vertical flange 66, a second horizontal flange 68, and a second vertical flange 60. A sealing member 72 is attached to the horizontal flange 68 and faces downwardly.

Figure 3:
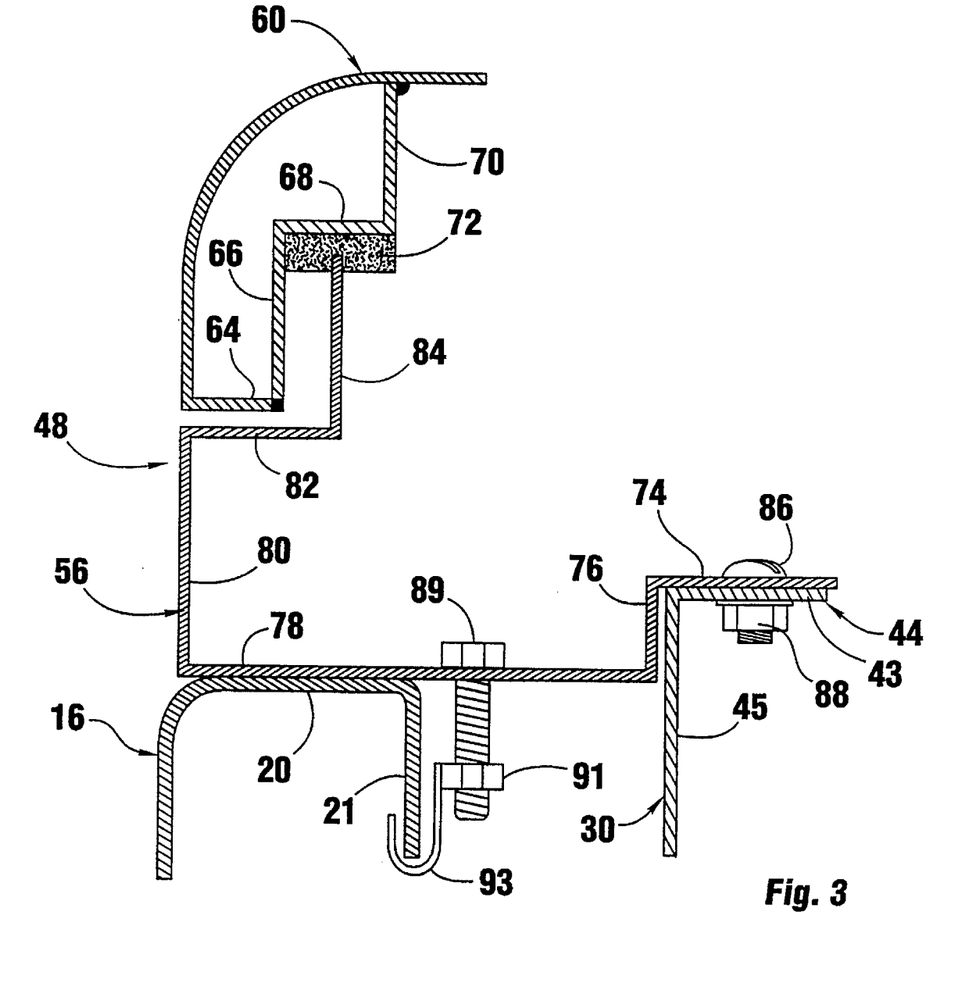
FIG. 3 is a sectional view taken along line 3—3 of FIG. 1.

The opposite end frame members 56, 58 of top frame 48 are shown in cross section in FIG. 3 and include an inner horizontal flange 74, a downwardly extending vertical flange 76, an L leg 78 which joins another L leg 80 to form an L shape, an upper horizontal flange 82, and an upper vertical flange 84 which engages sealing member 72. The lower horizontal flange 74 mates with the horizontal rim flange 43 of chest bottom 30, and the lower vertical flange 76 of top frame 48 surrounds and mates against the vertical rim flange 45. A bolt 86 extends through the horizontal flange 74 and the horizontal rim flange 43 and is secured by a nut 88. In this configuration the mating engagement of flanges 74, 76 with rim flanges 43,45 prevents moisture, rain, or other elements from entering between the joint formed between these flanges.

Horizontal leg 78 forms a wing flange which extends over the top edge 20 of side wall 16 and which can be secured in place by means of a bolt 89 having a nut 91 threaded on its lower end. A hook 93 is welded to nut 91 and hooks over the lower edge of a flange 21 on the upper edge 20 of side wall 20 of truck 10.

Figure 4:
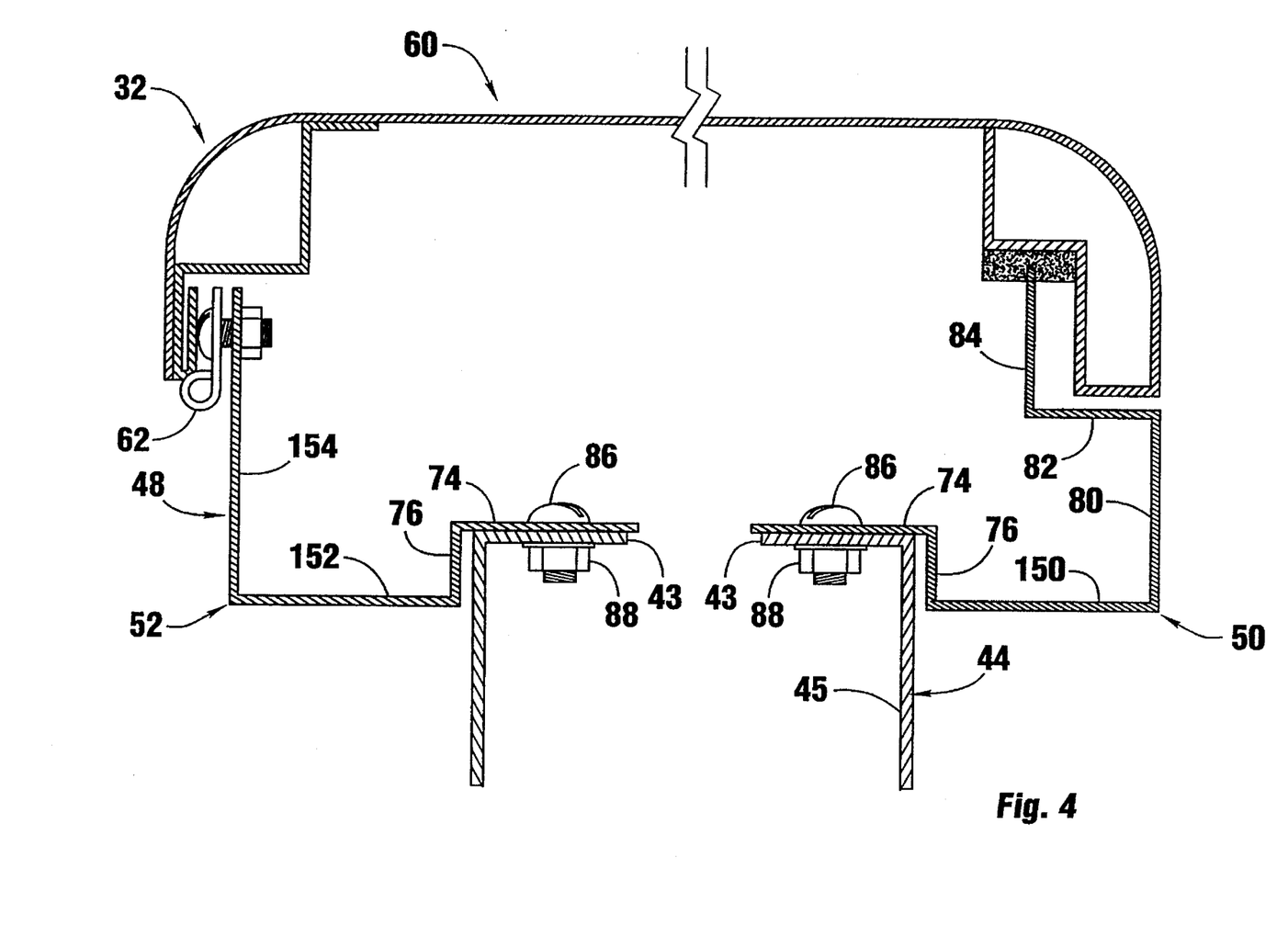
FIG. 4 is a sectional view taken along line 4—4 of FIG. 2.

FIG. 4 illustrates the manner in which the lid 60 mates with the front frame member 50 and the rear frame member 52 of top frame 48. The cross section of front frame member 50 is the same as for end frame members 54, 56 except that an L-leg 150 is somewhat shorter than L-leg 78 of end frame members 54, 56. The rear frame member 52 is comprised of lower horizontal flange 74, lower vertical flange 76, an L-leg 152, and a vertical L-leg 154 which is connected at its ends to upper vertical flanges 84 of end frame members 54, 56.

Figure 5:
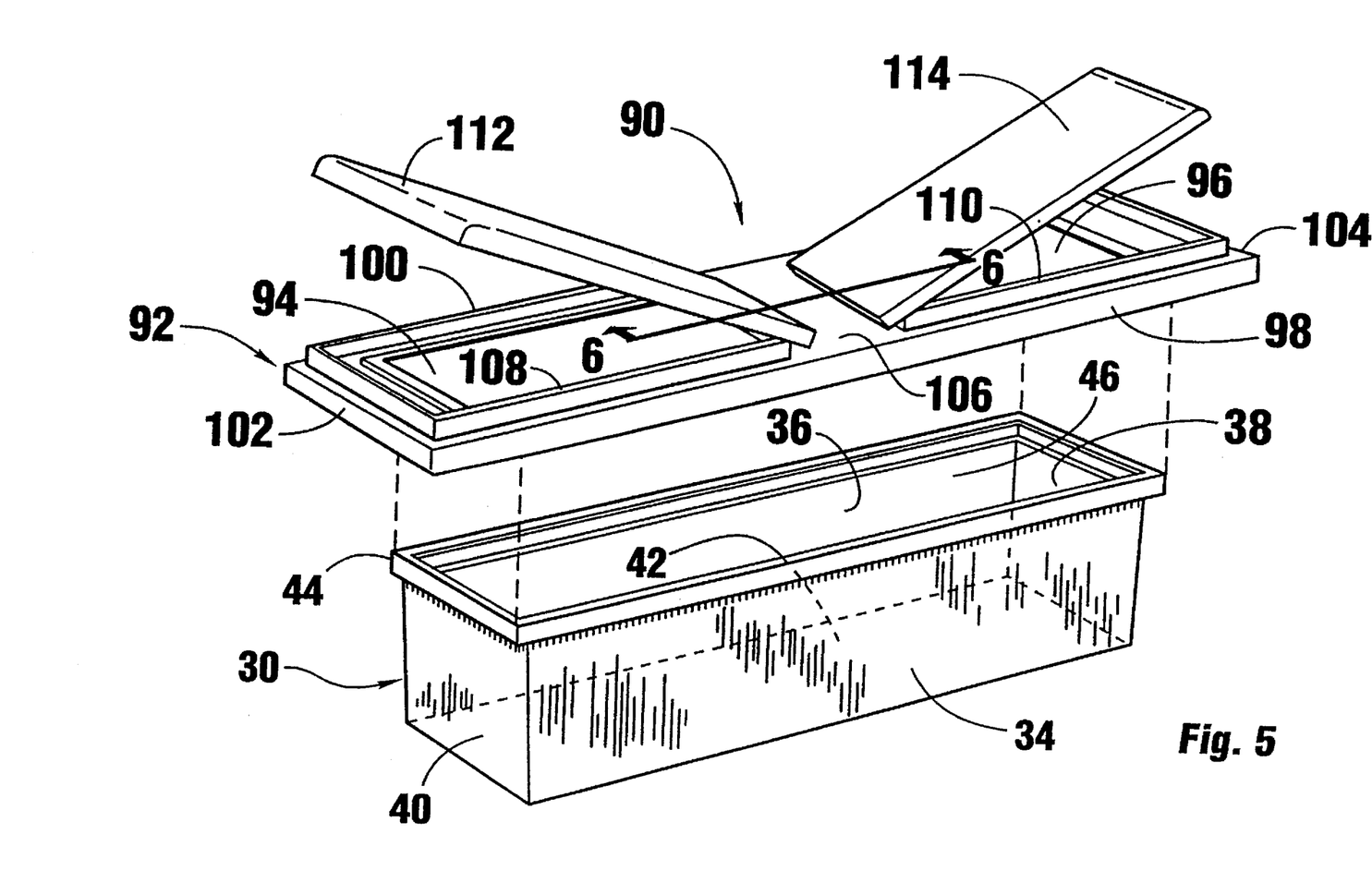
FIG. 5 is an exploded pictorial view of a modified form of the present invention.

Referring to FIG. 5, a modified form of the tool chest is designated by the numeral 90. The tool chest 90 includes a tool bottom 30 which is identical to the chest bottom 30 which appears in FIG. 1. Corresponding numerals have been used in FIG. 5 to designate parts which correspond between the tool box 10 in FIG. 2 and the tool box 90 in FIG. 5.

Figure 6:
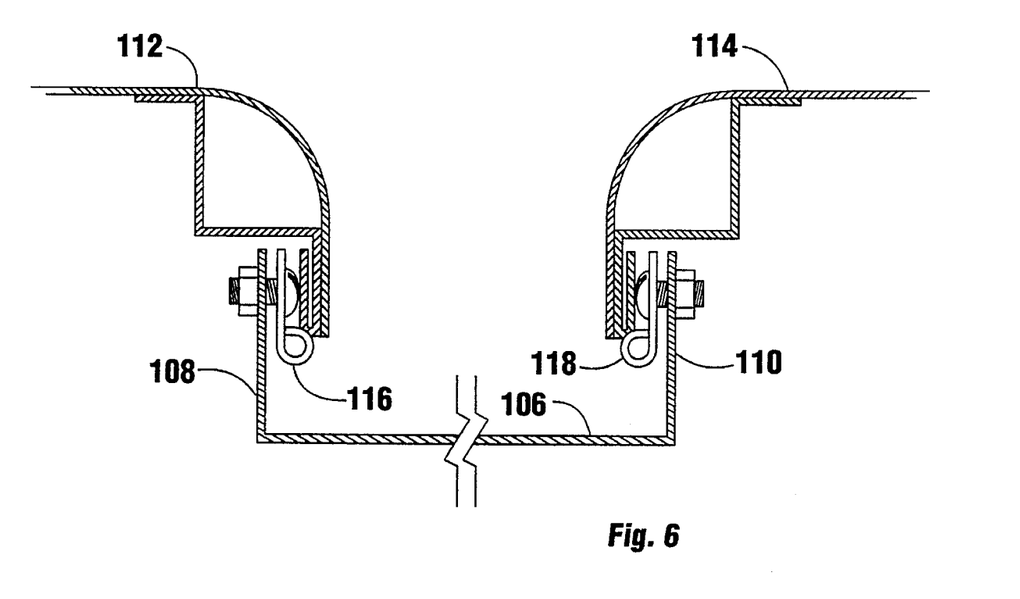
FIG. 6 is a sectional view taken along line 6—6 of FIG. 5.

A rectangular top frame 92 includes a first opening 94 and a second opening 96 formed by a front frame member 98, a rear frame member 100, end frame members 102, 104, and a cross frame member 106. Extending around the first opening 94 is a first rectangular flange 108, and extending around a the second frame opening 96 is a second rectangular flange 110. A first lid 112 is hinged by a hinge 116 (FIG. 6) to the frame member so as to move from its open position shown in FIG. 5 to a closed position in covering relation over the first opening 94. A second lid 114 is hinged by means of a hinge 118 to move from an open position shown in FIG. 5 to a closed position in covering relation over second opening 96.

The cross sectional configuration of the top frame 92 when it is placed over the chest bottom 30 is the same as shown in FIG. 3 and therefore is not repeated for the modification shown in FIG. 5.

Figure 7:
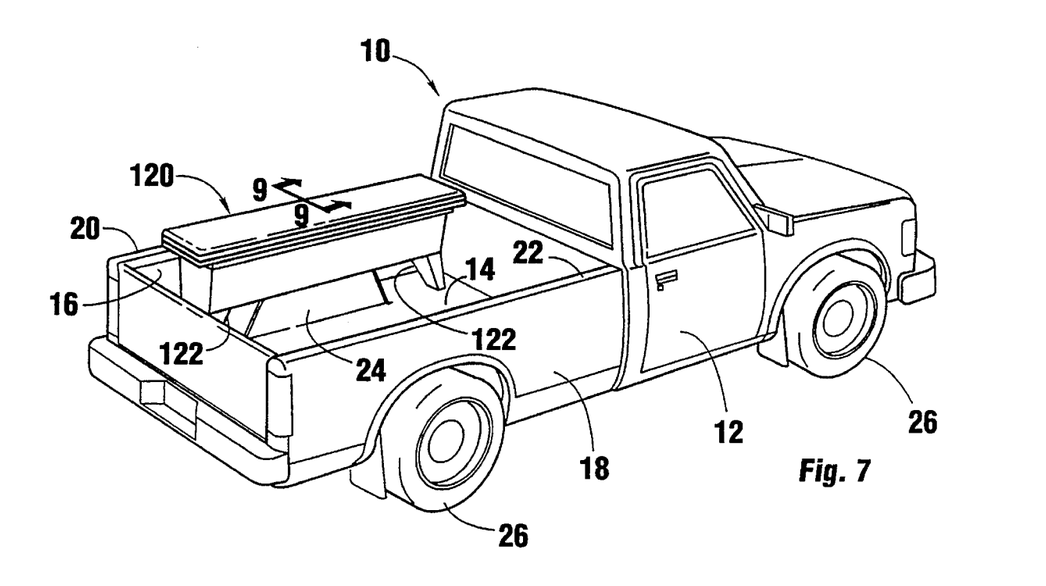
FIG. 7 is a pictorial view of a pickup truck having a further modified form of the present invention mounted therein.
Figure 8:
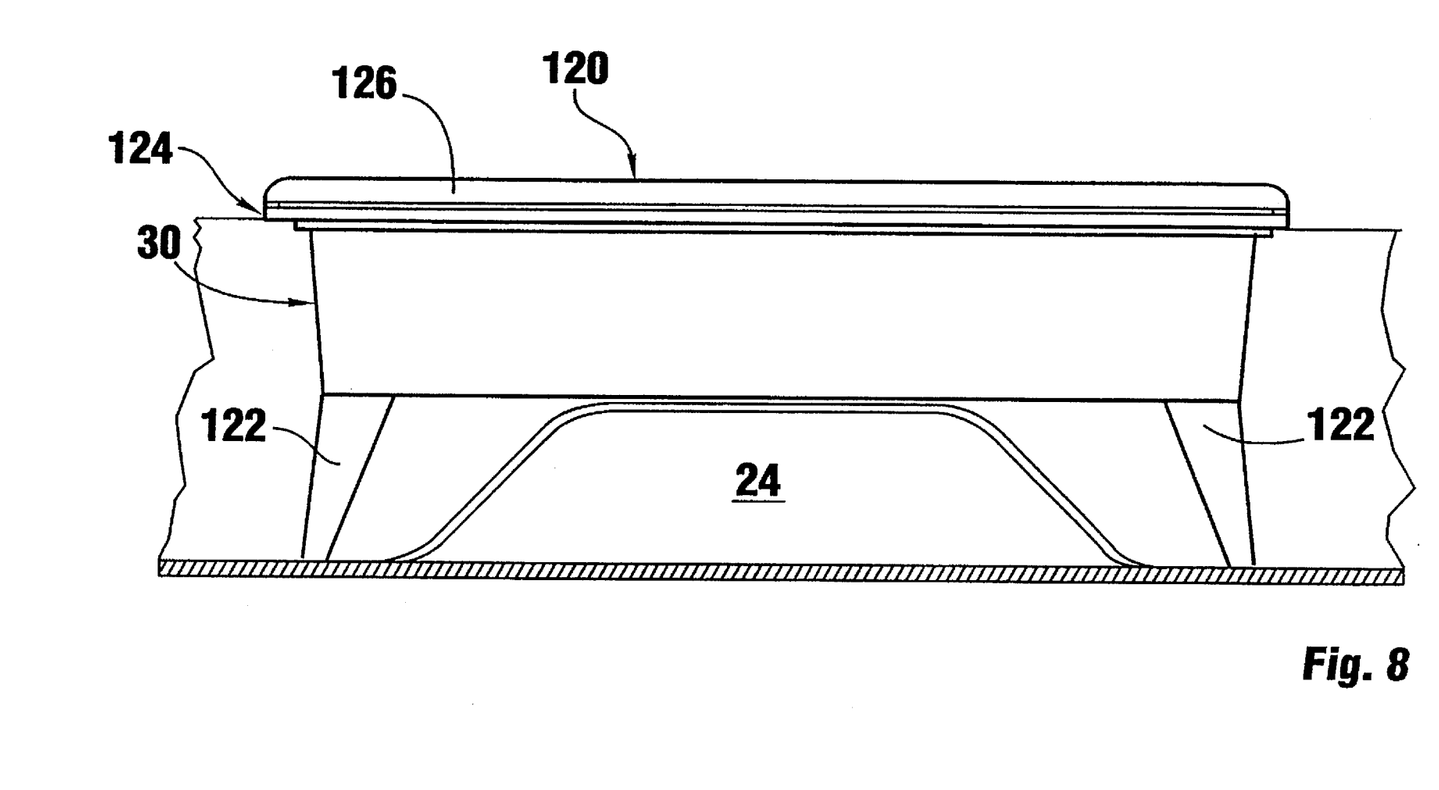
FIG. 8 is a front elevational view of the tool box appearing in FIG. 5.
Figure 9:
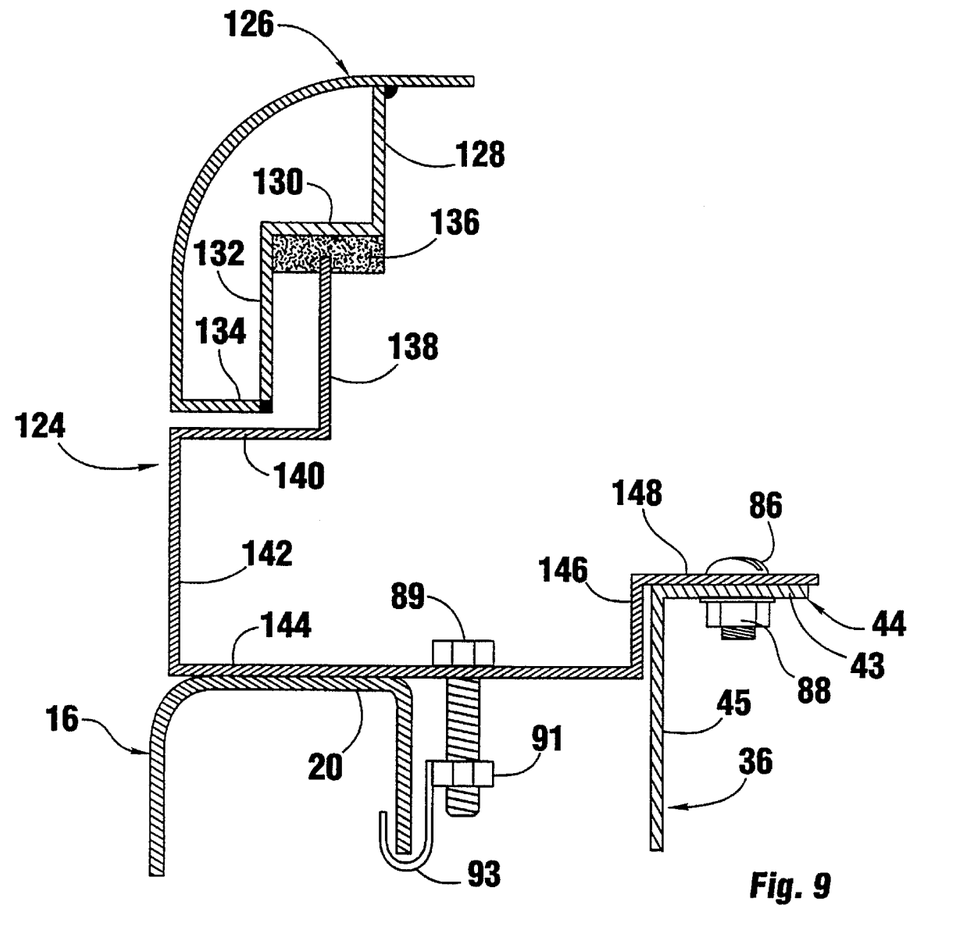
FIG. 9 is a sectional view taken along line 9—9 of FIG. 7.

Referring to FIG. 7 a third modified form of the invention is shown and is designated by the numeral 120. Tool chest 120 includes a pair of downwardly extending legs 122 which straddle the wheel well 124 as shown in FIGS. 7 and 8. Tool chest 120 includes a top frame 124 having a lid 126. The cross sectional configuration of the rear edge of top frame 124, when mated to the chest bottom is shown in FIG. 9. The top lid 126 includes a vertical flange 128, a horizontal flange 130, and a vertical flange 132, and a horizontal flange 134.

The sealing member 136 is fitted to the downwardly presented surface provided by horizontal flange 130.

The rear portion of rectangular frame 124 in cross section includes a vertical flange 138 the upper edge of which engages sealing member 136. Extending from upper vertical flange 138 is a horizontal flange 140 which turns downwardly to form a vertical flange 142, then inwardly to form a horizontal flange 144, then upwardly to form a vertical flange 146 and then horizontally to form a horizontal flange 148. Flanges 146, 148 matingly engage the flanges 43 and 45 respectively of the bottom chest in the same manner as shown in FIG. 3. Similarly a bolt 86 and a nut 88 secure the two together. The rear wall 36 of the chest bottom 30 is placed in facing engagement with the side wall 16 of the vehicle 10. In this position the horizontal flange 144 engages the upper edge 20 of side wall 16 where it is secured in place by means of bolt 89, nut 91, and hook 93. Other suitable securing means such as screws, rivets, or other fasteners may be used in the place of bolt 89, nut 91, and hook 93.

Because of the dimensions of the vehicle 10, it is not possible to make a tool box capable of fitting in the pickup bed in the manner shown in FIGS. 1 or 7 and still meet the shipping requirement of most shippers. Therefore the present invention makes possible the shipping of the device by making it possible to manufacture and ship the top section separately from the chest bottom. In this configuration the girth of the chest bottom plus the length of the chest bottom is less than 130 inches. By girth is meant the dimension around the perimeter of the device in its narrowest dimension. The length is then added to this girth to achieve the total number of inches.

Similarly the top section meets the requirement that the girth plus the length be less than 130 inches. However, when the top section and the chest bottom are assembled together the assembled tool box exceeds the 130 inches when its girth is added to its length. Thus it is possible to ship the top and the bottom in separate packages and then to assemble the two at their destination. They may be assembled quickly and easily.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A chest for use in a pickup truck having a carrier bed and side walls extending upwardly from opposite sides of said carrier bed, said side walls each having an upper edge, said chest comprising:

a chest bottom having a bottom wall, a front wall, a rear wall, and opposite end walls forming a compartment having an open upper end, said front, rear, and end walls having upper edges which together form a rim which includes in cross section a horizontal surface and a vertical surface extending around said open upper end;

a chest top having a chest lid and a top frame forming a frame opening;

said top frame having in cross section a horizontal surface and a vertical surface engaging said horizontal and vertical surfaces respectively of said rim;

said chest lid being sized to fit in covering relation over said frame opening to enclose said compartment;

a hinge pivotally securing said lid to said top frame for pivotal movement from an open position providing access to said frame opening to a closed position in covering relation over said frame opening; and first securing means detachably securing said top frame to said rim of said chest bottom whereby said chest top forms a top closure over said open upper end of said chest bottom when said lid is in said closed position.

2. A chest according to claim 1, wherein said top frame forms only one said frame opening and only one of said lids fits over said one frame opening.

3. A chest according to claim 1 wherein said top frame forms more than one of said frame openings.

4. A chest according to claim 3 comprising more than one of said lids, each of which is fitted in covering relation over one of said frame openings when in said closed position.

5. A chest according to claim 1 wherein said first securing means extends through said horizontal surfaces of said top frame and said rim to detachably join them together.

6. A chest according to claim 1 wherein said first securing means is enclosed within said compartment when said lid is in said closed position.

7. A chest for use in a pickup truck having a carrier bed and side walls extending upwardly from opposite sides of said carrier bed, said side walls each having an upper edge, said chest comprising:

a chest bottom having a bottom wall, a front wall, a rear wall, and opposite end walls forming a compartment having an open upper end, said front, rear, and end walls having upper edges which together form a rim extending around said open upper end;

a chest top having a chest lid and a top frame forming a frame opening;

said chest lid being sized to fit in covering relation over said frame opening to enclose said compartment;

a hinge pivotally securing said lid to said top frame for pivotal movement from an Open position providing access to said frame opening to a closed position in covering relation over said frame opening;

first securing means detachably securing said top frame to said rim of said chest bottom whereby said chest top forms a top closure over said open upper end of said chest bottom when said lid is in said closed position;

a first support leg extending downwardly from one of said opposite end walls of said chest bottom; and a second support leg extending downwardly from the other of said opposite end walls of said chest bottom.

* * * * *